(12) United States Patent
Rubin

(10) Patent No.: US 7,882,873 B2
(45) Date of Patent: Feb. 8, 2011

(54) RUN-FLAT TIRE

(76) Inventor: Eldad Rubin, 48 Homa Vemigdal Street, 58335 Holon (IL)

( * ) Notice: Subject to any disclaimer, the term of this patent is extended or adjusted under 35 U.S.C. 154(b) by 768 days.

(21) Appl. No.: 11/884,722

(22) PCT Filed: Feb. 28, 2006

(86) PCT No.: PCT/IL2006/000271

§ 371 (c)(1),
(2), (4) Date: Nov. 1, 2007

(87) PCT Pub. No.: WO2006/090399

PCT Pub. Date: Aug. 31, 2006

(65) Prior Publication Data

US 2009/0139622 A1    Jun. 4, 2009

(30) Foreign Application Priority Data

Feb. 28, 2005 (IL) .................................. 167150
Apr. 14, 2005 (IL) .................................. 168034

(51) Int. Cl.
B60C 17/02 (2006.01)
B60C 17/01 (2006.01)
B60C 5/22 (2006.01)
(52) U.S. Cl. .................... 152/165; 152/339.1; 152/519
(58) Field of Classification Search ......... 152/155–157, 152/165, 166, 331.1, 339.1, 342.1, 516, 518, 152/519, 376
See application file for complete search history.

(56) References Cited

U.S. PATENT DOCUMENTS

| 507,089 | A | 10/1893 | Owen |
|---|---|---|---|
| 1,976,235 | A | 10/1934 | Lawrence |
| 2,415,616 | A | 2/1947 | Wallace |
| 2,469,300 | A | 5/1949 | Heyneman |
| 3,161,219 | A | 12/1964 | Danhi |

FOREIGN PATENT DOCUMENTS

| DE | 1605609 A | 1/1970 |
|---|---|---|
| DE | 1 680 441 | 4/1970 |
| DE | 29802522 U1 | 2/1998 |
| DE | 19902055 A1 | 3/2000 |
| FR | 2141876 A | 1/1973 |
| FR | 2 863 201 | 6/2005 |
| GB | 2298400 A | 9/1996 |
| WO | 92/14619 A1 | 9/1992 |
| WO | 00/32422 A1 | 6/2000 |

Primary Examiner—Adrienne C Johnstone
(74) Attorney, Agent, or Firm—Allston L. Jones; Peters Verny, LLP

(57) ABSTRACT

A run-flat tire of improved load bearing capacity after being punctured is disclosed. The tire has two circumferential sidewalls, at least one circumferential intermediate wall interposed between the sidewalls, and a transverse base extending from one sidewall to the other and defining a compartment between a sidewall and an adjacent intermediate wall or between two adjacent intermediate walls. Each compartment is adapted to assume an expanded symmetrical configuration when an adjacent sidewall or intermediate wall is punctured. A carcass portion is provided within each sidewall, each intermediate wall and base. A shock absorber is provided in the vicinity of a junction connecting each intermediate wall to the base. A padding element is affixed to the inner liner portion applied to the bead wrap of each intermediate wall.

17 Claims, 15 Drawing Sheets

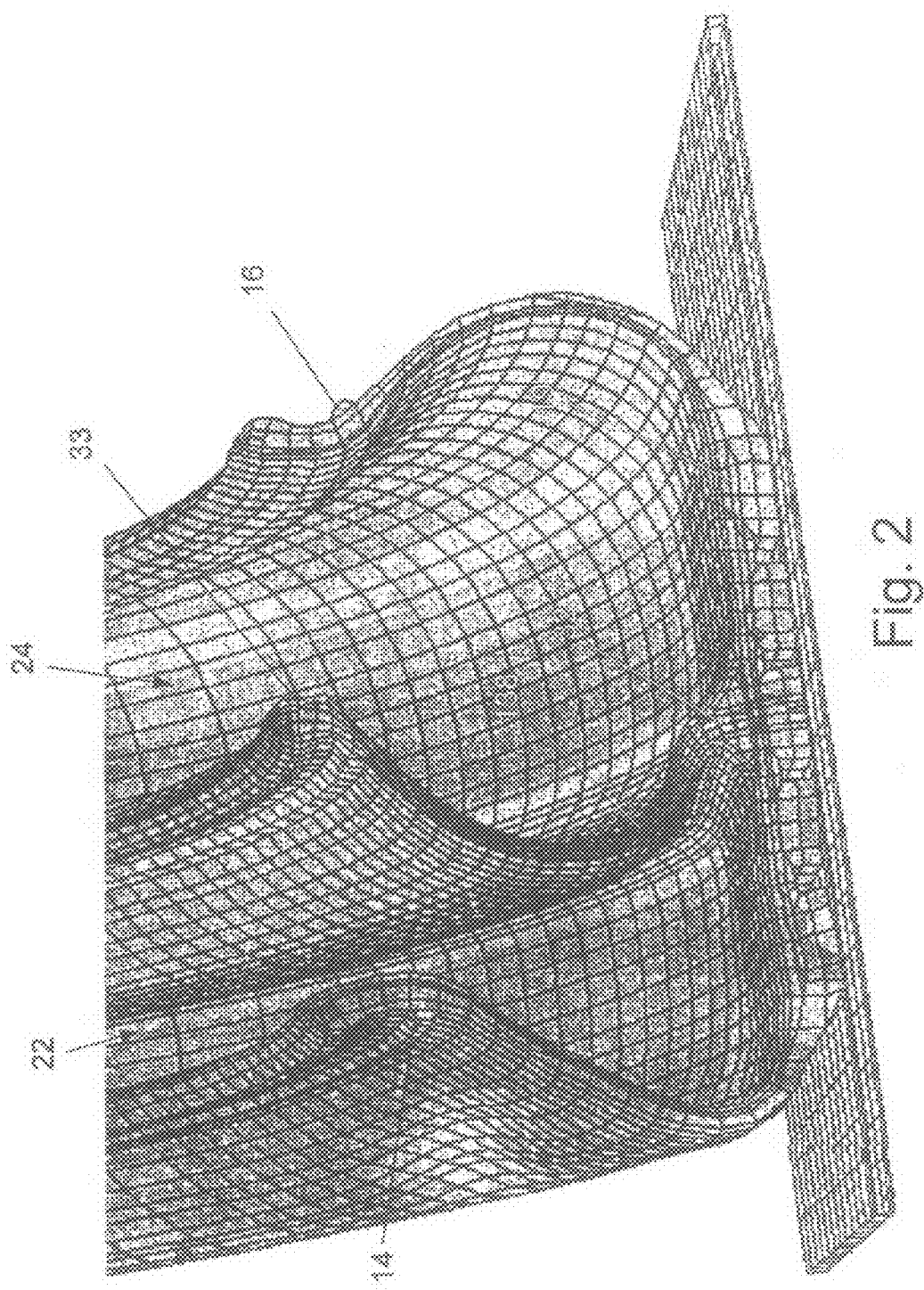

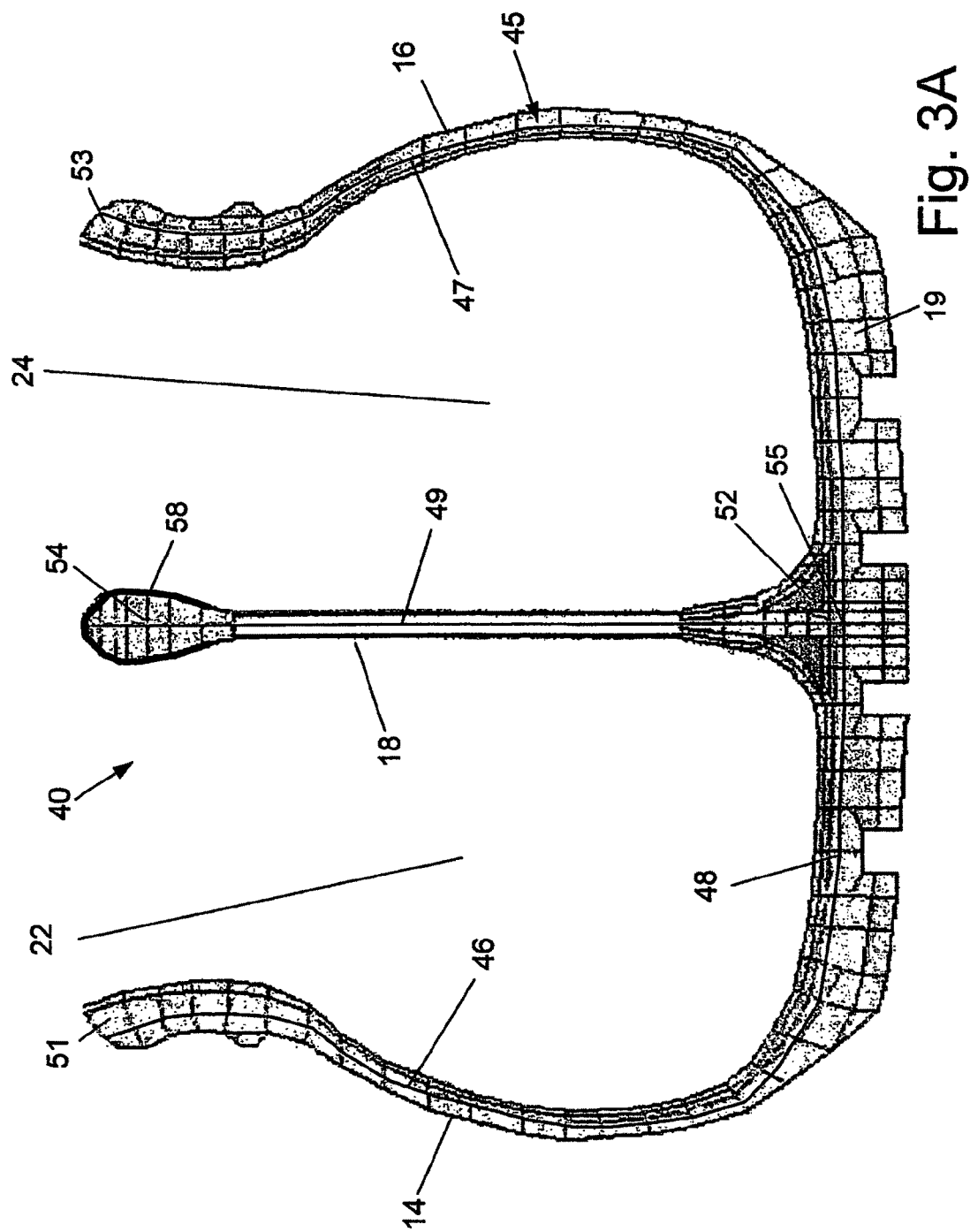

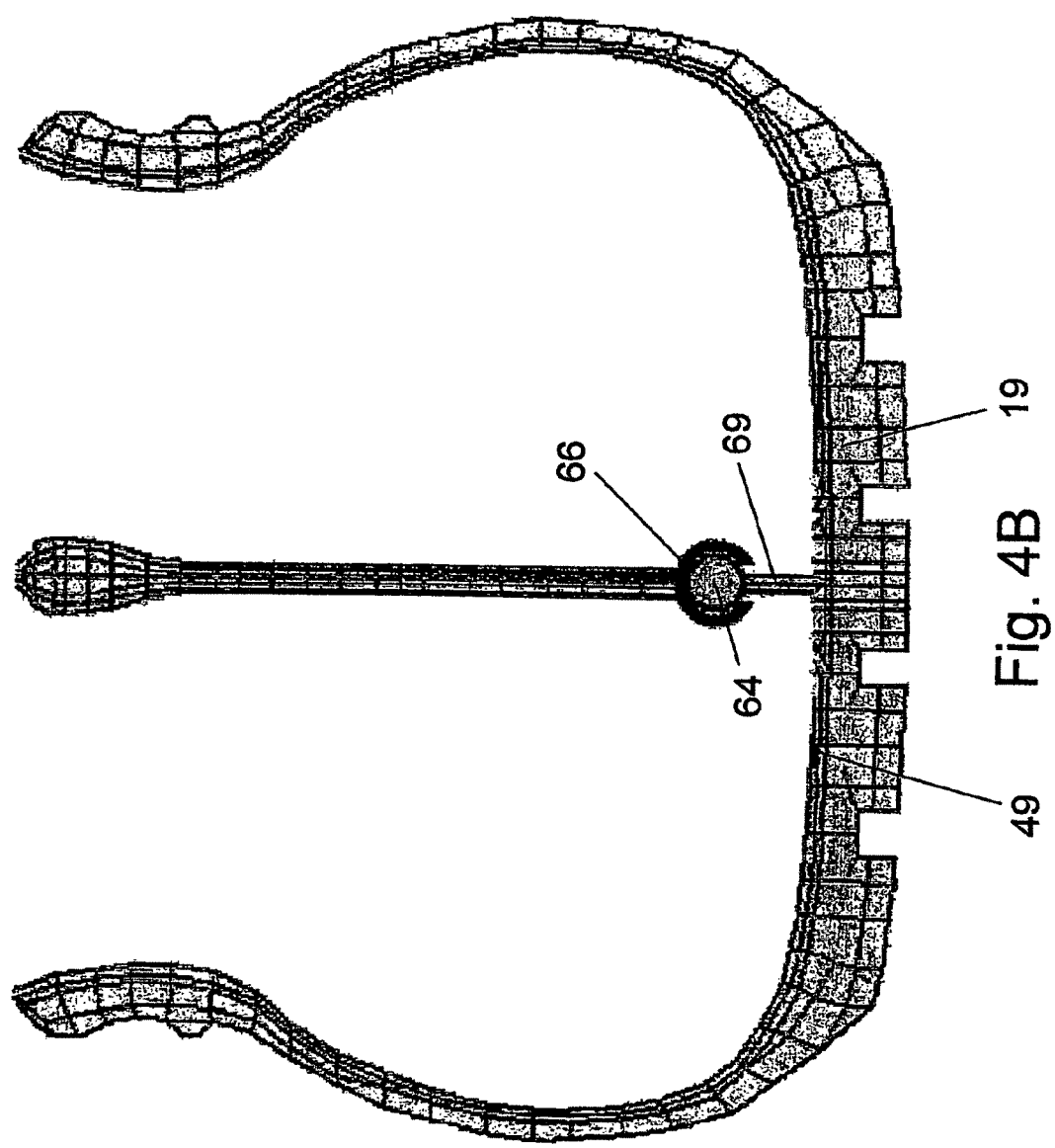

RUN-FLAT TIRE

FIELD OF THE INVENTION

The present invention relates to the field of automobile tires. More particularly, the invention relates to a novel tire configuration which allows the automobile to continue to travel for a considerable distance without reducing its speed after a tire has been punctured.

BACKGROUND OF THE INVENTION

Tire manufacturers have been developing tires for motorized vehicles that can sustain a puncture so that the tires may continue to carry the load of the vehicle for a short period of time. These types of tires will hereinafter be referred to as "run-flat tires."

One prior art run-flat tire is comprised of more than one adjacent compartments, which are isolated one from the other by a separating wall, so that one compartment may continue to carry the load of the vehicle, even though another compartment is punctured and structurally fails. However, the intermediate separating walls are generally not reinforced, and therefore, a wall that is not reinforced suffers from overheating and deformation at points of high stress concentration. Consequently, such tires are suitable only for such vehicles as a jeep or a forklift that advance at a relatively low speed and develop a correspondingly relatively low stress concentration.

"Compagnie Generale d'Establissements Michelin", Clermont-Ferrand, France, has developed a run-flat tire arranged such that a ring of hard rubber is secured to the wheel rim. If a tire structurally fails after being punctured, the ring engages the underlying road surface and carries the load of the vehicle. The vehicle does not provide a smooth ride when being supported by the ring, due to the low elasticity thereof. Also, the vehicle cannot advance quickly since the ring tends to overheat and to be torn. Furthermore, tire replacement is made difficult due to the addition of the ring, requiring the use of a specially designed apparatus for the replacement operation.

It is an object of the present invention to provide a run-flat tire which allows an automobile to continue to travel for a considerable distance, e.g. 200 km, without drastically reducing its speed after the tire has been punctured.

It is an additional object of the present invention to provide a run-flat tire which provides an automobile with a smooth ride after the tire has been punctured.

It is an additional object of the present invention to provide a run-flat tire that is made of the same materials and has the same dimensions as prior art tires.

Other objects and advantages of the invention will become apparent as the description proceeds.

SUMMARY OF THE INVENTION

The present invention provides a run-flat tire which comprises two circumferential sidewalls terminating with a bead wrap at the inner portion thereof; at least one circumferential intermediate wall interposed between the sidewalls and terminating with a bead wrap at the inner portion thereof; a transverse base extending from one sidewall to the other, thereby defining a compartment between a sidewall and an adjacent intermediate wall or between two adjacent intermediate walls; a reinforcing element e.g. made of steel net and additional flexible reinforcing material such as an elastomerized fabric hereinafter referred to as a "carcass" comprising a portion within each sidewall, each intermediate wall and base; and shock absorber means provided in the vicinity of a junction connecting each of said intermediate walls to said base. Due to the configuration of said carcass and said shock absorber means, each of said compartments is adapted to assume an expanded symmetrical configuration when an adjacent sidewall or intermediate wall is punctured.

A single continuous inner liner, which serves as a sealing means to prevent the passage of air from an inflated compartment, is applied to the inner face of the sidewalls and to the two faces of each of the intermediate walls. The shock absorber means is provided between an inner liner portion in the vicinity of a junction connecting each of the intermediate walls to the base and the corresponding carcass portion such that body plies, and optionally at least one additional ply in contact with said inner liner portion, are interposed between said inner liner portion and said shock absorber means. As referred to herein, a "body ply" is a central layer for improving the strength of the tire and an "additional ply" is a flexible layer made of rubber material which is adapted to support or protect the thin and rupturable inner liner when placed in contact with the latter. Each body ply and additional ply are produced and affixed in a way well known to those skilled in the art to form a composite integral tire.

The shock absorber means may be in contact with the corresponding carcass portion, or at least one body ply and/or at least one additional ply is interposed between the shock absorber means and the corresponding carcass portion.

In one aspect, a padding element is affixed to the inner liner portion applied to the bead wrap of each intermediate wall.

The shock absorber means reduces the stress concentration in the vicinity of a junction connecting an intermediate wall to the base. The padding element reduces the stress concentration and the applied frictional forces in the vicinity of a bead wrap. Due to its reduced stress concentration and symmetrical configuration when an adjacent sidewall or intermediate wall is punctured, the load bearing capacity of the tire of the present invention after being punctured is significantly increased with respect to prior art run-flat tires. An automobile being supported by the run-flat of the invention can therefore continue to travel for a considerable distance, e.g. 200 km, without having to significantly reduce its speed after the tire has been punctured.

The existence of the shock absorber means in the vicinity of a junction connecting an intermediate wall to the base also reduces the stiffness thereat. The region of lower stiffness provides an intermediate wall with increased resiliency to changing road conditions, such as stones or other impediments over which the tire travels.

In one aspect, the shock absorber means connects a carcass portion within an intermediate wall to a carcass portion within the base.

The carcass portions may be single-ply or two-ply.

In one aspect, a carcass portion within a sidewall bifurcates at an intermediate point thereof and a carcass portion within an intermediate wall bifurcates within the bead wrap thereof. A cross member may connect the inner end of the two plies of the carcass portion within a sidewall. A plurality of cross members may connect the two plies of the carcass portion within the bead wrap of the intermediate portion.

In one aspect, two carcass portions extend substantially throughout each of the base, sidewalls and intermediate wall, the carcass portions within the intermediate wall being connected with an upper carcass portion within the base, and each carcass portion within the base being combined with a corresponding carcass portion within each of the sidewalls.

In one aspect, the shock absorber means connects a carcass portion within an intermediate wall to a carcass portion within the base, by a T-shaped connection.

In one aspect, the shock absorber means is at least one padding element, e.g., a sponge.

In another aspect, the shock absorber means is a ball joint, made from e.g., metal-rubber bond, said ball joint being received in a socket which is connected to the carcass portion within an intermediate wall and the carcass portion within the base.

In one aspect, an unloaded intermediate wall is configured with a doubly curved structure. The intermediate wall has two symmetrical convex regions, each of said convex regions protruding into a different compartment adjacent to said intermediate wall. By employing a doubly curved intermediate wall, the deformation of the intermediate wall will be advantageously limited when the tire is punctured, thereby preventing excessive bending and damage to said intermediate wall.

BRIEF DESCRIPTION OF THE DRAWINGS

In the drawings:

FIG. 2 is a magnified view of Detail A of FIG. 1;

FIG. 3A illustrates a schematic cross-sectional view of a run-flat tire according to another embodiment of the invention;

FIG. 4B is a schematic cross-sectional view of a run-flat tire according to a further embodiment of the invention;

DETAILED DESCRIPTION OF PREFERRED EMBODIMENTS

The present invention is a novel run-flat tire that has a reinforcing carcass portion in each of the sidewalls, intermediate walls, and base, and shock absorber means in the vicinity of the junction between each of the intermediate walls and base. Each compartment defined by a sidewall and an adjacent intermediate wall or by two adjacent intermediate walls is adapted to assume an expanded symmetrical configuration when an adjacent sidewall or intermediate wall is punctured.

Figure 11:
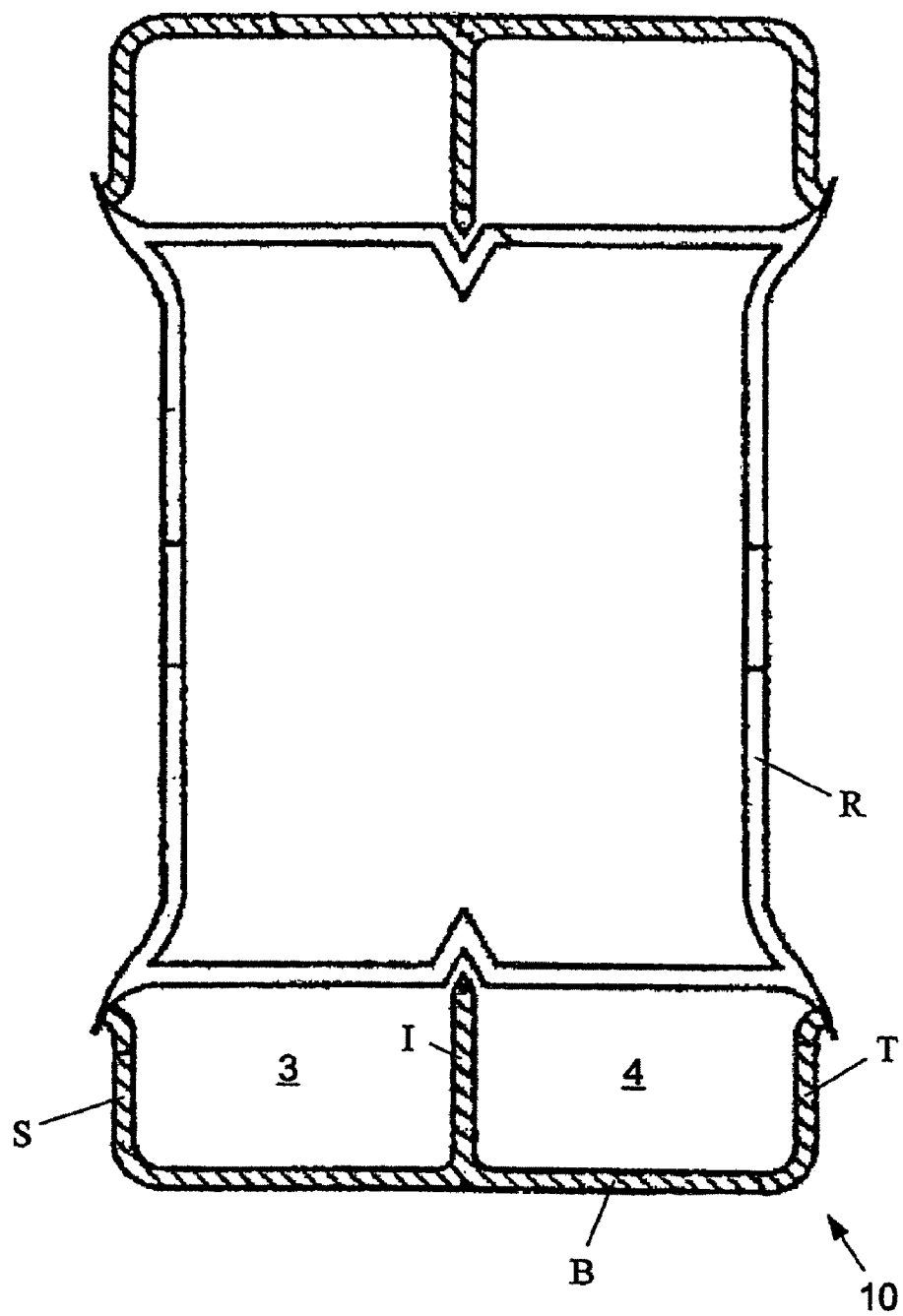
FIG. 11 is a vertical cross-sectional view of a prior art run-flat tire.

A prior art run-flat tire is illustrated in FIG. 11. The prior art tire, which is designated by numeral 10, has sidewalls S and T, intermediate wall I interposed therebetween, and a transverse base B extending from sidewall S to sidewall T, thereby defining compartments 3 and 4 between a pair of adjacent walls. Tire 10 is shown to be mounted on tire rim R.

In contrast to the novel configuration of the run-flat tire of the present invention, compartment 3 of prior art tire 10 will not assume a symmetrical configuration when the corresponding sidewall T is punctured, and compartment 4 of prior art tire 10 will not assume a symmetrical configuration when the corresponding sidewall S is punctured. When prior art tire 10 is of the type associated with an intermediate wall I which is not reinforced, e.g. is provided without a carcass portion, the intermediate wall will be expanded at a greater rate than a reinforced sidewall which is not punctured. When prior art tire 10 is of the type associated with an intermediate wall I which is overly reinforced, e.g. intermediate wall I is made of two reinforced walls which are bonded together or connected to rim R, the intermediate wall will be expanded at a lower rate than a sidewall which is not punctured due to its increased stiffness or due to the interference between the two bonded walls of which the intermediate wall is comprised. Since an expanded compartment will not assume a symmetrical configuration, two regions of such a punctured tire are exposed to an excessive stress concentration—at the connecting point between intermediate wall I and base B, and at the point of engagement between sidewall S, sidewall T, and intermediate wall I and the corresponding recess of rim R. Overheating and deformation are noticeable at these regions of high stress concentration, often resulting in an excessive stress concentration throughout the intermediate wall and sidewalls of greater than 3000 psi which is liable to lead to the rupturing of the tire. Consequently, such prior art run-flat tires are suitable only for such vehicles as a jeep or a forklift that advance at a relatively low speed and develop a correspondingly relatively low stress concentration.

FIG. 3A illustrates a schematic cross-sectional view of a run-flat tire generally designated by numeral 40, according to one embodiment of the invention. Run-flat tire 40 has sidewalls 14 and 16, intermediate wall 18 interposed therebetween, and a transverse base 19 extending from sidewall 14 to sidewall 16, thereby defining compartments 22 and 24 between a pair of adjacent walls. Sidewall 14, sidewall 16 and intermediate wall 18 terminate at the inner portion thereof (i.e. proximate to the rim on which the tire is mounted) with bead wraps 51, 53, and 54, respectively. Each bead wrap, which encloses steel cords or the like around the inner periphery of the tire, is engageable with complementary recesses of the rim in such a way that compartments 22 and 24 become inflated as air is introduced therein.

Tire 40 is reinforced by a one-ply carcass 45. Each portion of carcass 45, in addition to the steel net, preferably comprises an elastomerized fabric such as nylon, polyester, rayon or a similar reinforcing material. Rayon, or example, is particularly suitable as a reinforcing material for the carcass. Rayon is of cellulose origin, and therefore has high resistance to heat and stress. In addition to portions 46, 47 and 48 which are provided within sidewall 14, sidewall 16 and base 19, respectively, following the contour thereof carcass 45 also has portion 49 which is provided within intermediate wall 18. Carcass portion 49 within intermediate wall 18 is substantially perpendicular to carcass portion 48 within base 19, and is connected thereto, e.g. by welding, at point 55 by a T-shaped connection. In addition to the corresponding carcass portion, intermediate wall 18, as well as sidewall 14, sidewall 16 and base 19, is made from a plurality of layers including body plies and/or additional plies which are produced in a way well known to those skilled in the art to form a composite integral product. To reduce the stress concentration at connection point 55 to an acceptable level of approximately 218 psi, a shock absorber in the form of padding elements 52 is provided between an inner liner portion in the vicinity of a junction connecting intermediate wall 18 to base 19 and T-shaped connection 55 such that body plies and/or at least one additional ply in contact with the inner liner portion are interposed between the inner liner portion and the corresponding padding element 52. As shown, at least one body ply is interposed between a padding element 52 and T-shaped connection 55. Accordingly, padding elements 52 do not necessarily contact connection point 55, yet provide sufficient stress reduction during movement of intermediate wall 18 when exposed to road conditions. Padding elements 52 have a varying triangular cross section corresponding to the varying cross section of intermediate wall 18 as shown, or any other suitable shape.

Figure 10:
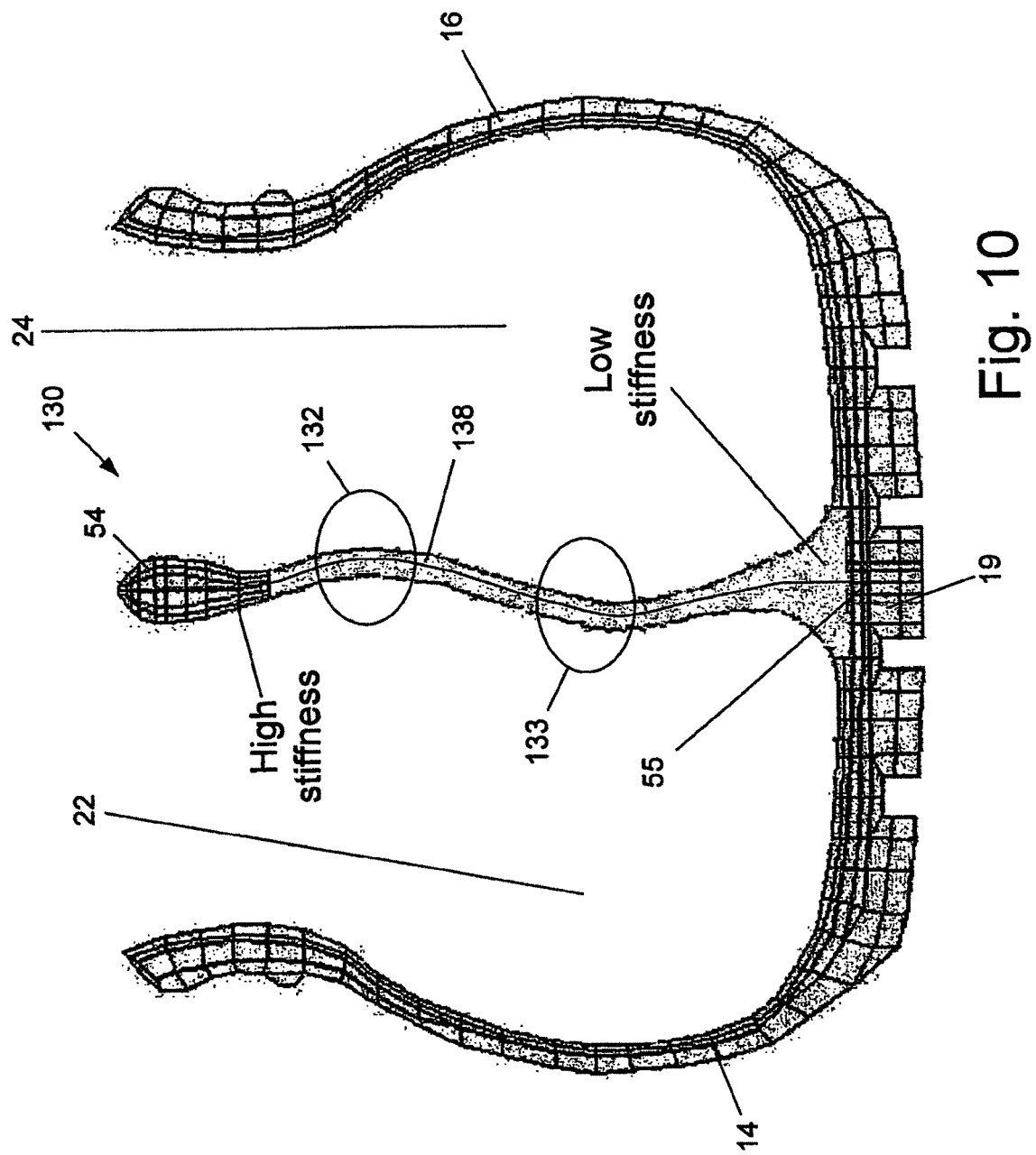
FIG. 10 is a schematic cross-sectional view of a run-flat tire according to a further embodiment of the invention wherein an intermediate wall has a doubly curved structure.

Padding elements 52 also contribute to a reduction in stiffness in the vicinity of the connection of intermediate wall 18 with base 19. This region of lower stiffness, which is indicated in FIG. 10, provides intermediate wall 18 with increased resiliency to changing road conditions, such as stones or other impediments over which the tire travels, and therefore reduces the stress concentration at T-shaped connection 55. The reduced stiffness in the vicinity of connection 55 reduces the increase of stress concentration thereat. If the stiffness of intermediate wall 18 in the vicinity of connection 55 were high, similar to the high stiffness in bead wrap 54, which is indicated in FIG. 10, and in sidewalls 14 and 16, the tire would encounter high resistance to road conditions, including impediments over which the tire travels, thereby increasing the risk of overheating and eventual failure of intermediate wall 18 when under load. The stress concentration within sidewalls 14 and 16 is considerably lower than within intermediate wall 18 since only one force component resulting from the corresponding compartment pressure acts on the corresponding sidewall, whereas two opposing force components derived from the two compartments 22 and 24, respectively, act on intermediate wall 18 and therefore cause the stress concentration within the latter to increase.

To reduce the stress concentration within bead wrap 54 of intermediate wall 18, padding element 58 is applied to the inner liner of bead wrap 54. Padding element 58 of bead wrap 54 also reduces the frictional forces acting on the interface between bead wrap 54 and the tire rim. The stress concentration within bead wrap 54 was found to be 500 psi without padding element 58 while padding elements 52 were added to connection point 55. By affixing padding element 58 to bead wrap 54, the stress concentration thereat was reduced to 204 psi when a sidewall was not punctured and to 360 psi when a sidewall was punctured.

Figure 3B:
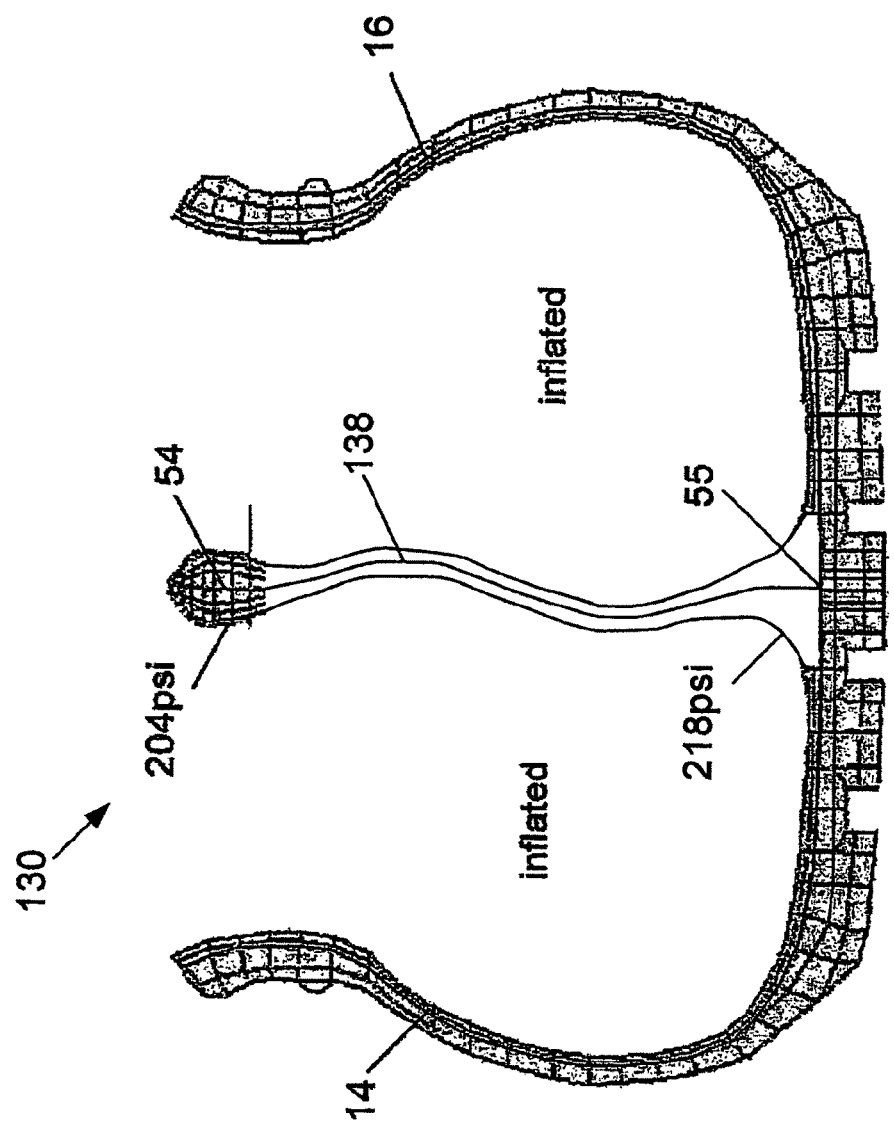
FIG. 3B illustrates a schematic cross-sectional view of another embodiment of a run-flat tire.

FIG. 3B illustrates a schematic cross-sectional view of another run-flat tire 130, under substantially normal load conditions. The sidewalls 14 and 16 are shown to be symmetrical, curving outwardly. Intermediate wall 138 is shown to have an S-shaped configuration. The stress concentration in the vicinity of connection point 55 was found to be 218 psi and within bead wrap 54 was found to be 204 psi.

Figure 3C:
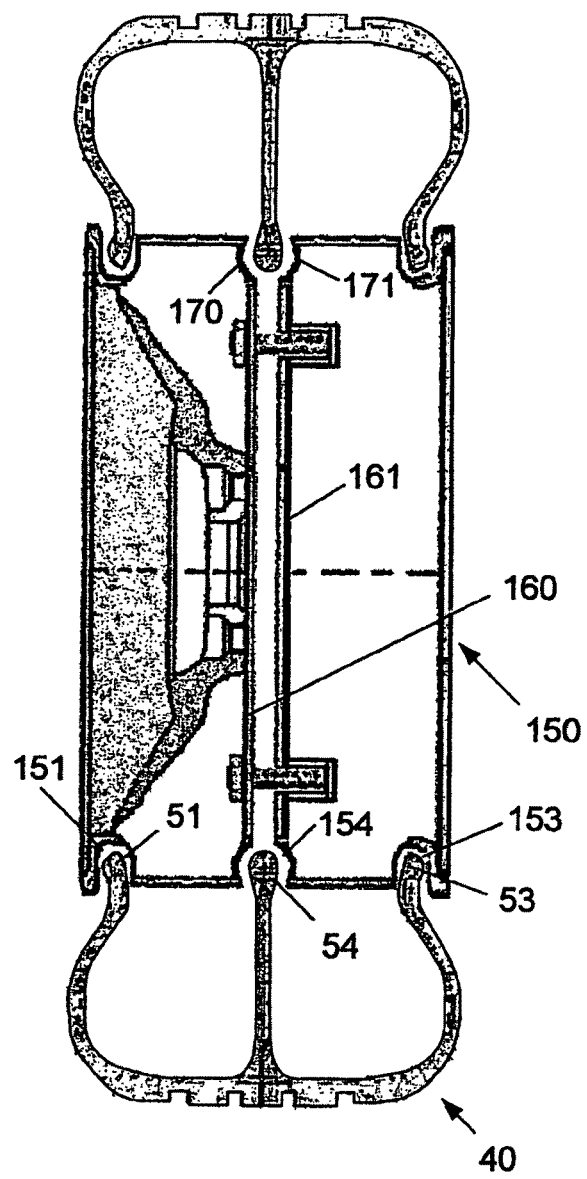
FIG. 3C illustrates the rim on which the run-flat tire of FIG. 3A is mounted in an open configuration.
Figure 3D:
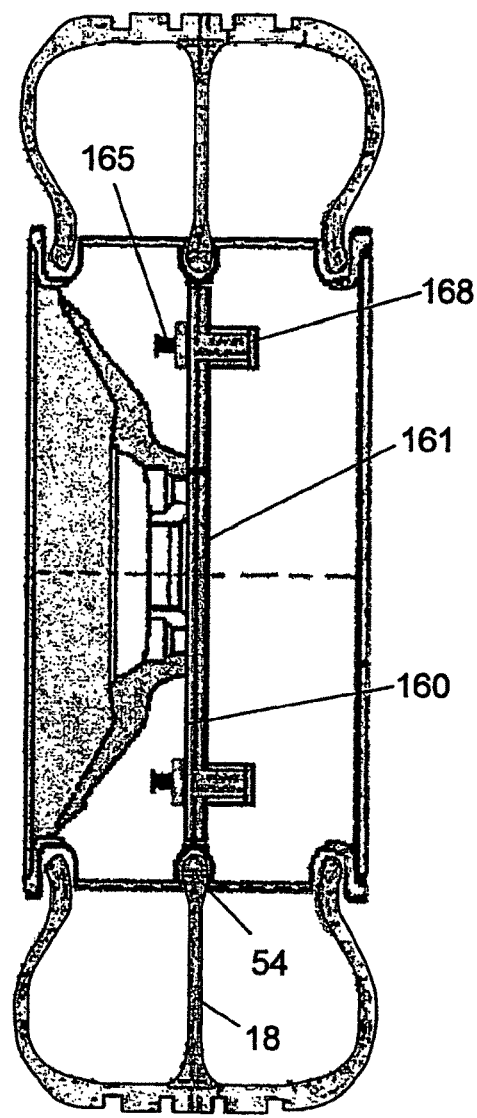
FIG. 3D illustrates the rim on which the run-flat tire of FIG. 3A is mounted in a closed configuration.

FIGS. 3C-D illustrate the securing of tire 40 to rim 150. FIG. 3C shows rim 150 in an open configuration and FIG. 3D shows rim 150 in a closed configuration. Bead wraps 51, 53, and 54 of tire 40 are mounted in complementary recesses 151, 153, and 154 of rim 150. Adjacent flanges 160 and 161, which terminate with curved walls 170 and 171, respectively, are separated from one another. As a plurality of bolts 165 are threadedly engaged with corresponding seats 168, as shown in FIG. 3D, flanges 160 and 161 are brought together in abutting relation, and curved walls 170 and 171 retain bead wrap 54 of intermediate wall in a fixed, disengageable position.

Figure 4A:
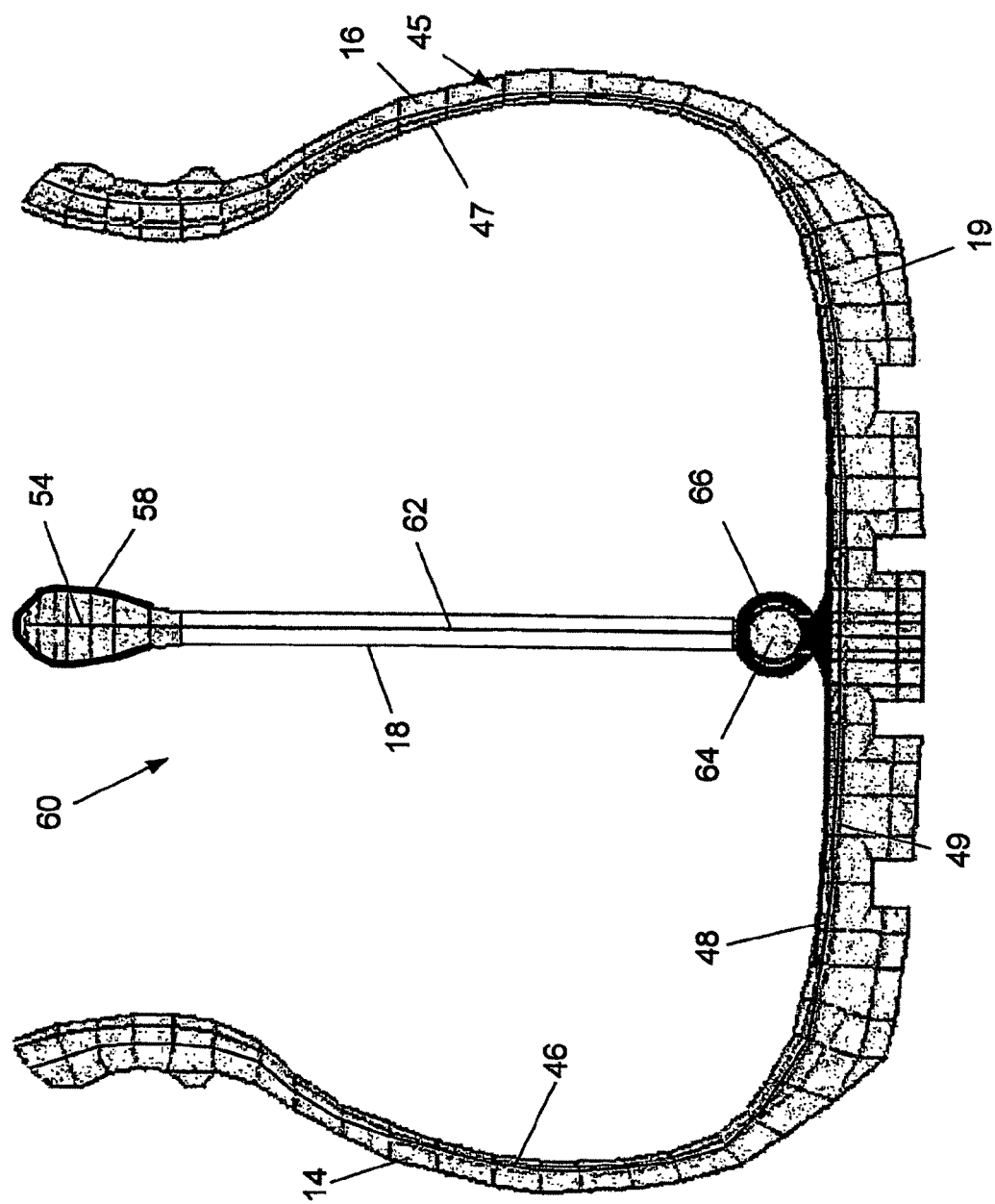
FIG. 4A is a schematic cross-sectional view of a run-flat tire according to another embodiment of the invention.

In the embodiment of FIG. 4A, the carcass of tire 60 is similar to that of tire 40 of FIG. 3A wherein one-ply carcass portions 46, 47 and 48 are provided within sidewall 14, sidewall 16 and base 19, respectively, following the contour thereof. Single-ply carcass portion 62 within intermediate wall 18 is separate from carcass portion 48 within base 19, but connected thereto by means of the shock absorber in the form of ball joint 64. Ball joint 64 is received within socket 66, which is affixed to base 19 and to carcass portion 62 within intermediate wall 18. Alternatively, as shown in FIG. 4B, ball joint 64 may be connected to carcass portion 48 within base 19 by means of an additional carcass portion 69.

Figure 5:
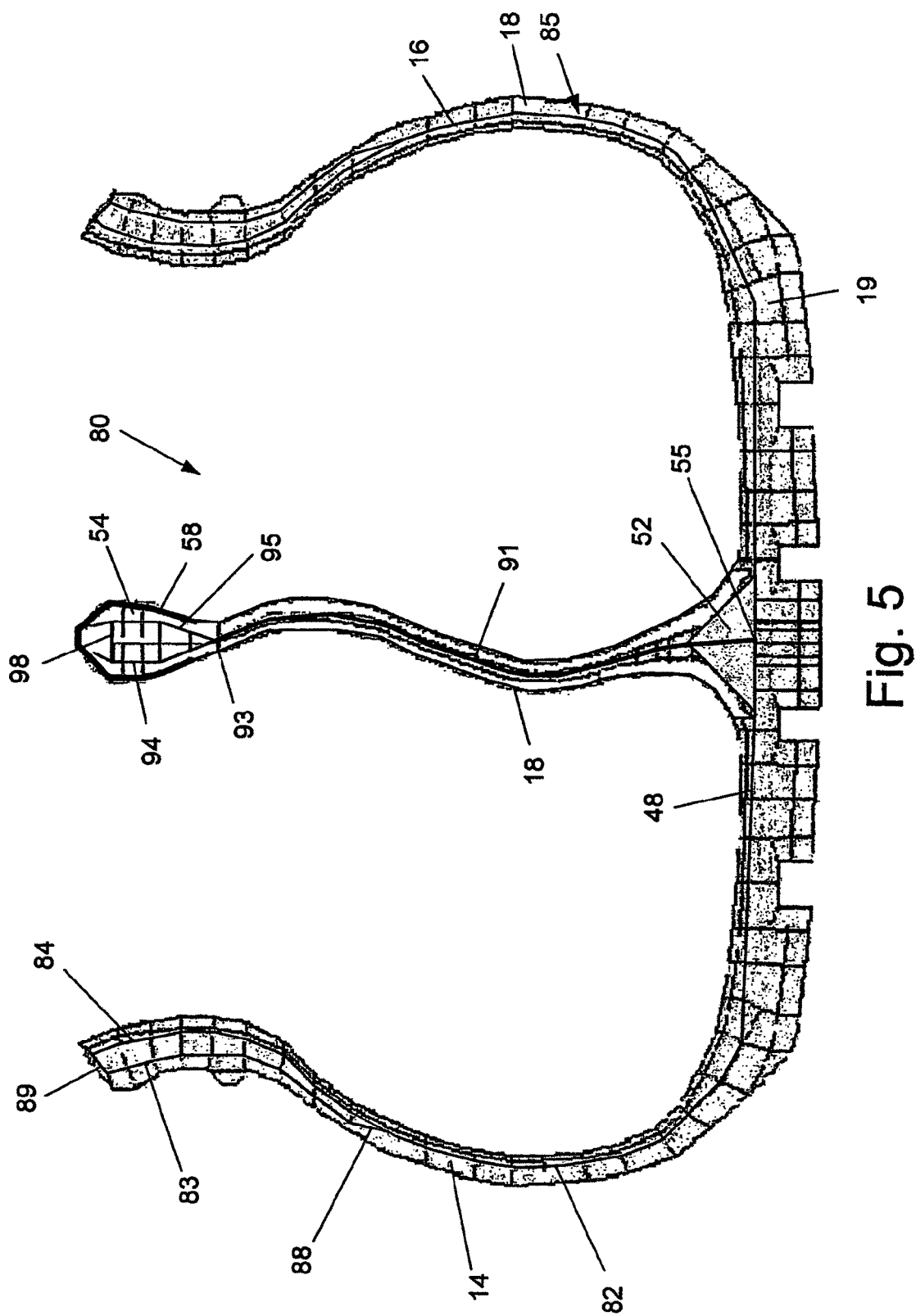
FIG. 5 is a schematic cross-sectional view of a run-flat tire according to another embodiment of the invention.

FIG. 5 illustrates another embodiment of the invention. Carcass 85 of tire 80 is configured with two-ply carcass portions within sidewalls 14 and 16 and intermediate wall 18, following the contour thereof and with single-ply carcass portion 48 within base 19. The carcass portions within sidewalls 14 and 16 have mirror symmetry, wherein single-ply carcass portion 82 extends from carcass portion 48 within base 19 to bifurcation point 88 centrally located within the corresponding sidewall. Carcass portion 82 divides into two-ply portions 83 and 84, which are connected by cross member 89 at the inner end thereof. Single-ply carcass portion 91 within intermediate wall 18 is substantially perpendicular to carcass portion 48 within base 19, and is connected thereto, e.g. by welding, at point 55 by a T-shaped connection. Carcass portion 91 extends from connection point 55 to bifurcation point 93 located within bead wrap 54, whereat carcass portion divides into two-ply portions 94 and 95. Carcass portions 94 and 96 are connected by three cross members 98, while the inner ends thereof are unconnected. A shock absorber in the form of padding elements 52 is provided between each inner liner of intermediate wall 18 and connection point 55. To reduce the stress concentration within bead wrap 54 of intermediate wall 18, padding element 58 is affixed to the inner liner of bead wrap 54.

Figure 6A:
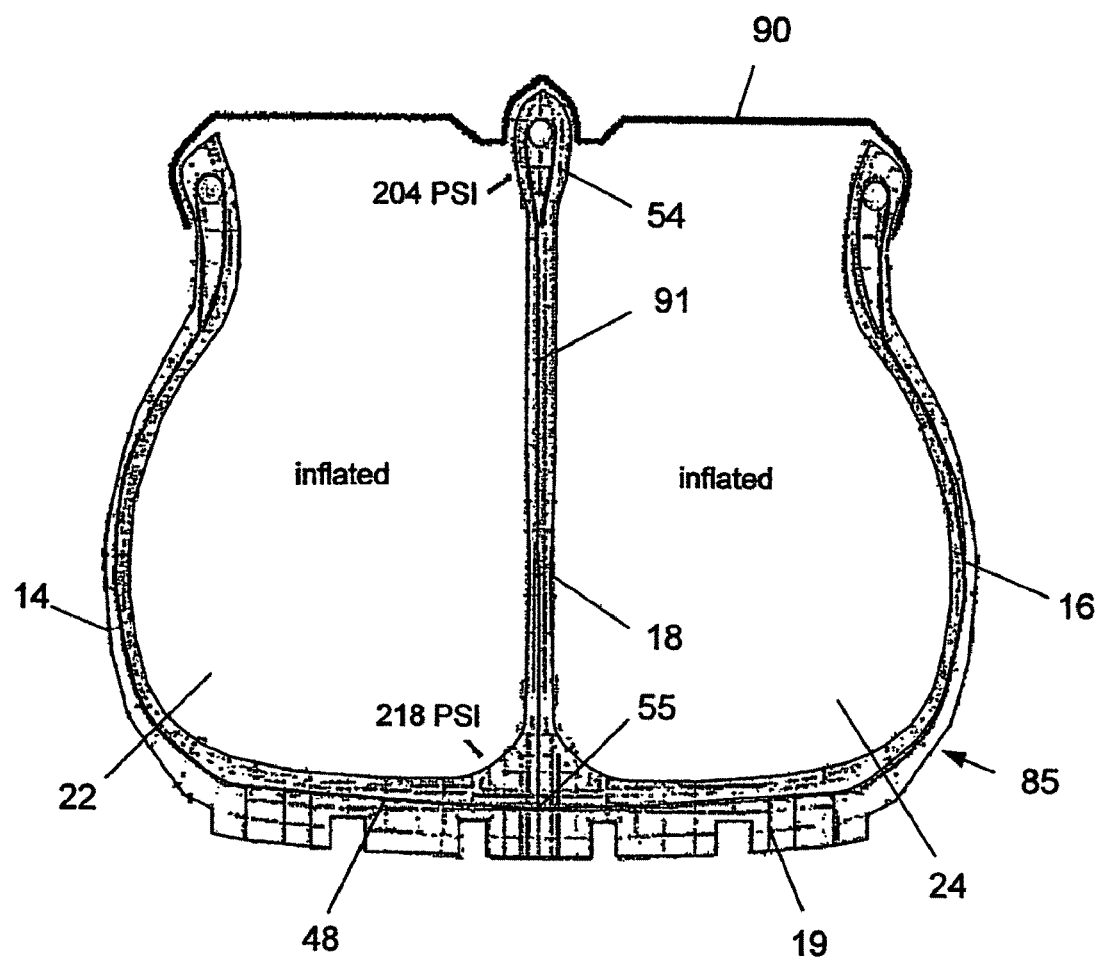
FIGS. 6A and 6B schematically illustrate the change of stress concentration within the intermediate wall, after a sidewall has been punctured.
Figure 6B:
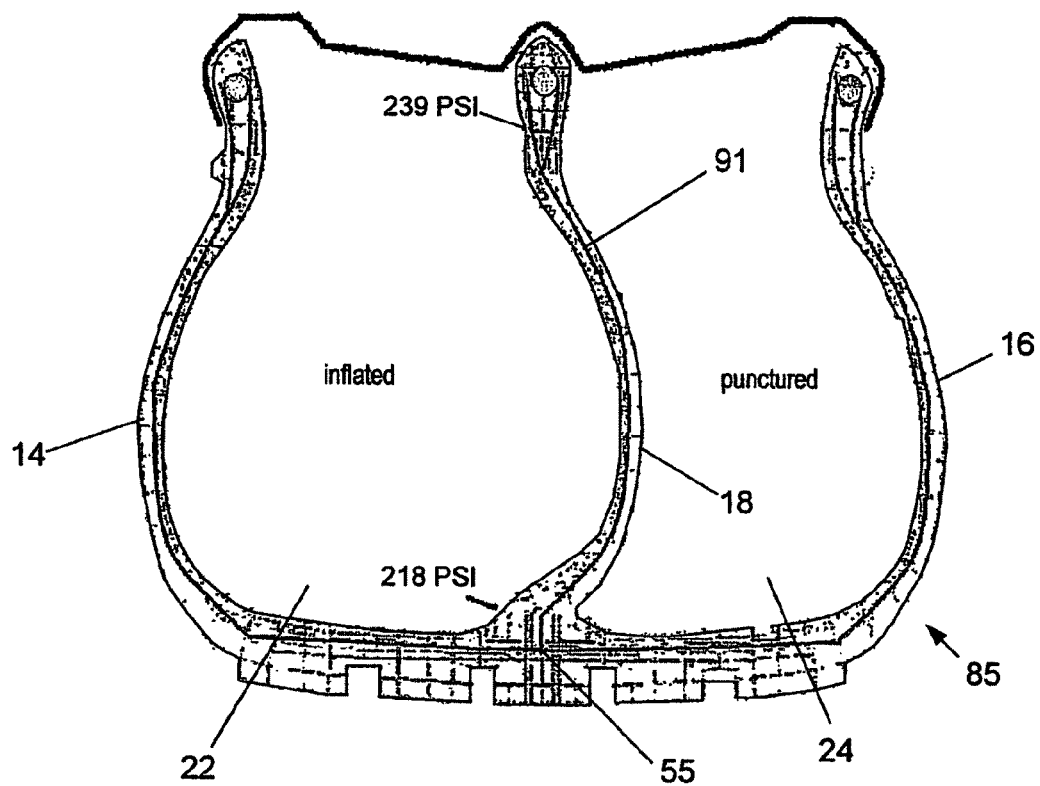

FIGS. 6A and 6B schematically illustrate the low stress concentration within a punctured run-flat tire of the present invention. The configuration of carcass 85 is shown in laboratory conditions, and the tire retaining carcass 85 therefore, does not exhibit the normal deformation resulting from interaction with road conditions.

In FIG. 6A, the two compartments 22 and 24 of the tire are completely inflated. Since the pressure within compartments 22 and 24 is substantially equal, carcass portion 91 within intermediate wall 18 remains substantially perpendicular to carcass portion 48 within base 19. The stress concentration in the vicinity of connection point 55 was found to be 218 psi and within bead wrap was found to be 204 psi. In FIG. 6B, sidewall 16 is punctured, and the air within compartment 24 outwardly escapes through the puncture. Due to the pressure differential between compartments 22 and 24, intermediate wall 18 and the carcass portion 91 included therein are expanded as shown, and the stress concentration within bead wrap 54 is increased to a relatively low value of 239 psi as a result of engagement with rim 90. Sidewall 14 and intermediate wall 18 of the inflated compartment have mirror symmetry, and therefore the stress concentration in the vicinity of connection point 55 is advantageously retained to a low value of 218 psi, equal to that of the completely inflated tire shown in FIG. 6A.

Figure 7:
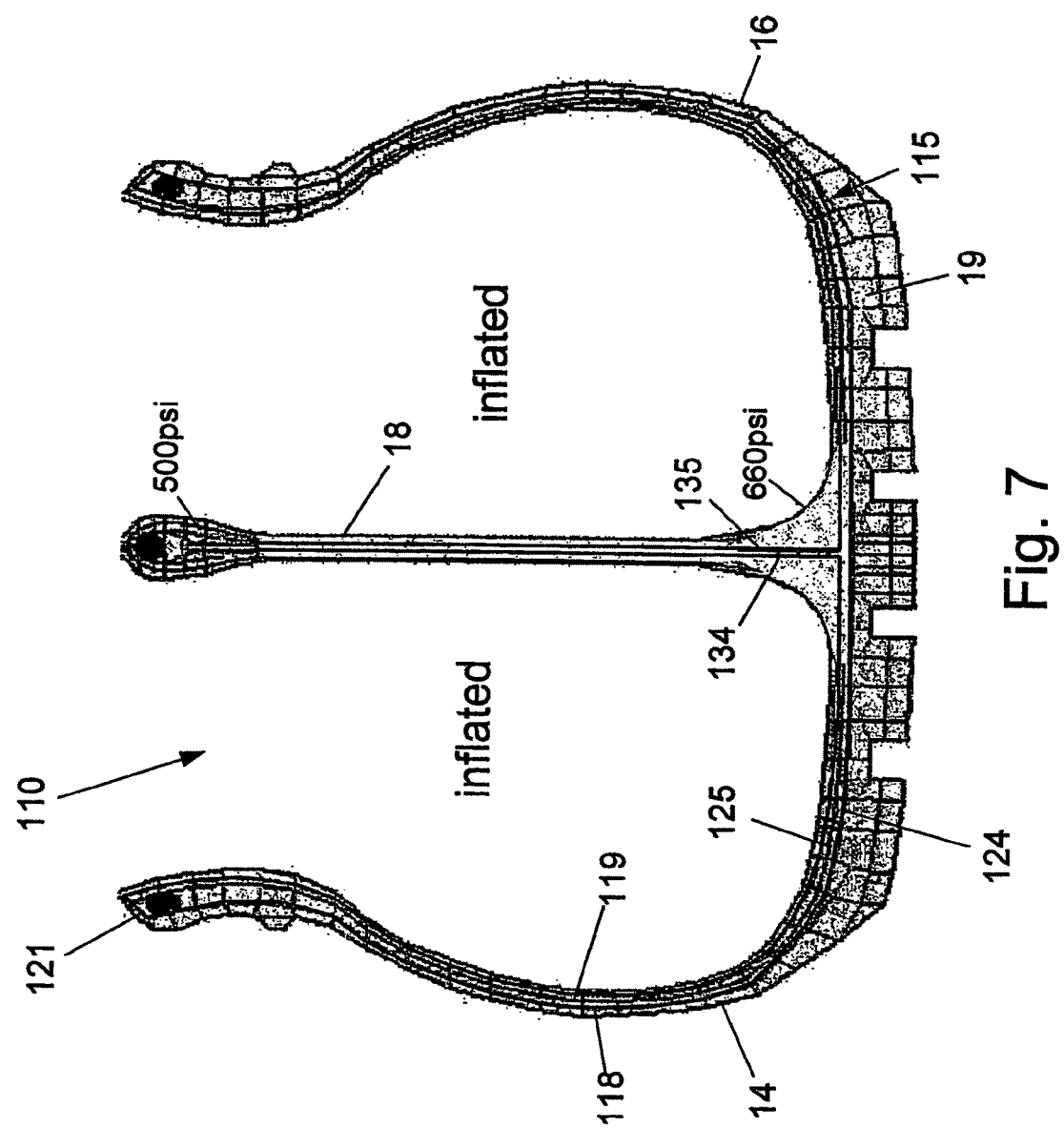
FIG. 7 illustrates another embodiment of the invention, wherein a tire has a two-ply carcass.

FIG. 7 illustrates another embodiment of the invention, wherein tire 110 has a two-ply carcass 115. The carcass portions in sidewalls 14 and 16 having mirror symmetry are two ply, and the carcass portion within base 19 are two ply. Carcass portion 125 within base 19 extends substantially throughout the length of base 19 and combines with each carcass portion 119 within each sidewall. Carcass portion 124 below carcass portion 125 within base 19 extends throughout the length of base 19 and combines with each carcass portion 118 within each sidewall. Carcass portions 118 and 119 extend through the corresponding sidewall and are connected by connecting member 121. Parallel carcass portions 134 and 136 extend within intermediate wall 18 and are connected to carcass portion 125 within base 19. The stress concentration within the bead wrap is 500 psi with the addition of a padding element. The stress concentration at the junction between intermediate wall 18 and base 19 is 660 psi without use of padding elements thereat, and ranges from 580-620 psi when padding elements are used thereat.

Figure 8:
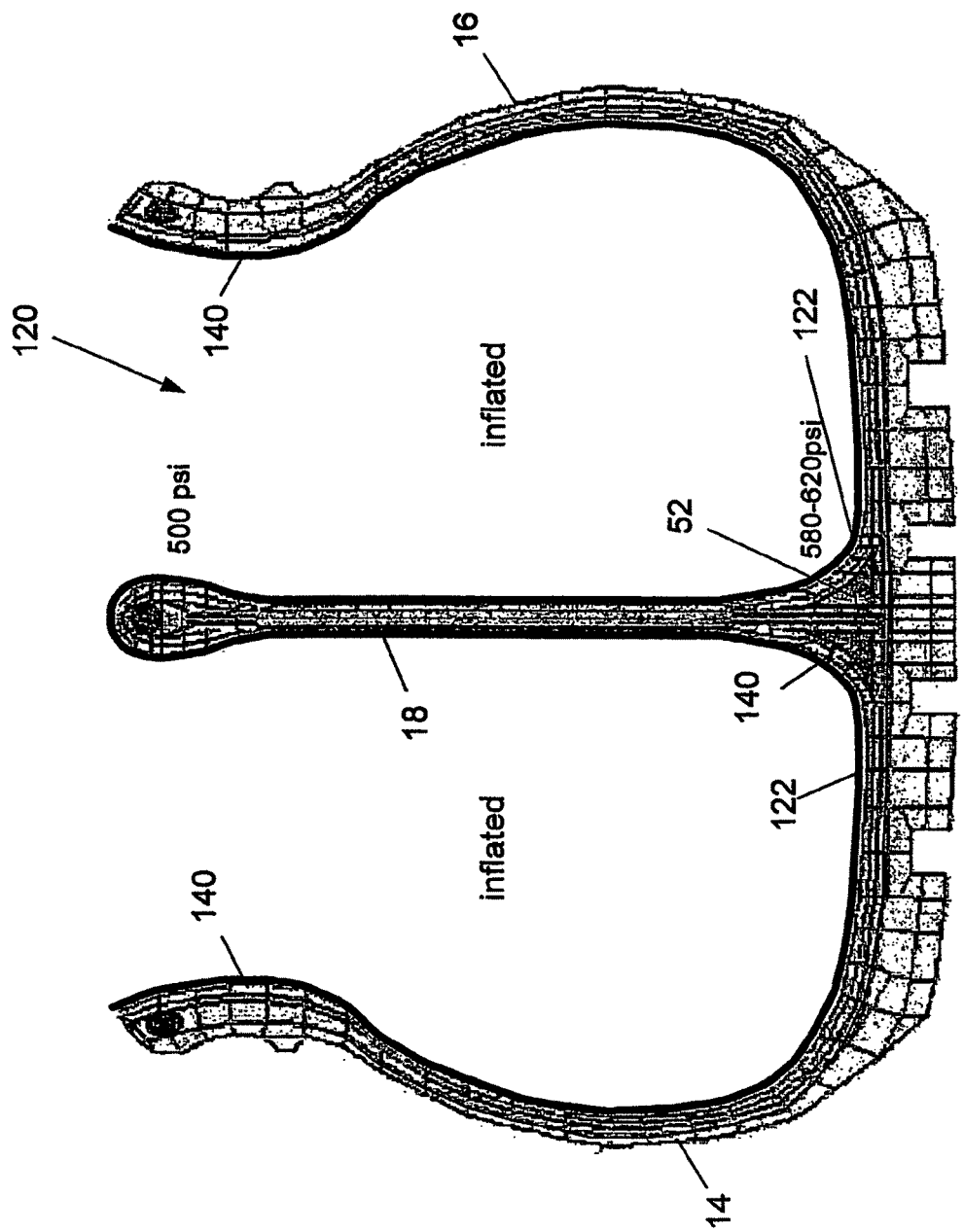
FIG. 8 illustrates a tire with two-ply carcass, shown in FIG. 7, with a shock absorber.

FIG. 8 illustrates tire 120 having a two-ply carcass, similar to tire 110 shown in FIG. 7, with the addition of a shock absorber. Tire 120 is shown to have a single inner liner 122, which is applied to the inner face of the body plies 140 and/or additional plies formed in sidewalls 14 and 16, and to the two faces of the body plies 140 formed in intermediate wall 18. When an additional ply of rubber material is employed, it is applied in such a way so as to be in contact with inner liner 122. It will be appreciated that the other embodiments of the invention, although not shown, are also provided with an inner liner, body plies, and/or additional plies. Inner liner 122 is made of a type of rubber which serves as a sealing means to prevent the passage of air from an inflated compartment. The carcass is embedded within the body plies and/or any additional ply of each corresponding wall. The shock absorber is in the form of padding elements 52, e.g. triangular sponges, each of which is applied in such a way so as to be in contact with the carcass or such that a body ply 140 and/or any additional ply from which tire 120 is interposed between a padding element 52 and the carcass portion. Padding elements 52 need not to be adhered to the carcass or to the body plies, when body plies are employed, since they are retained in place by the tension applied by inner liner 122. In this example, the stress concentration at the junction between intermediate wall 18 and base ranges between 580-620 psi when padding elements are used thereat.

FIGS. 1, 2, 3B, 9 and 10 illustrate another embodiment of the invention wherein intermediate wall 138 of unloaded tire 130 has a doubly curved structure. As shown in FIG. 10, intermediate wall 138 bends outwardly at the two regions 132 and 133 having a convex curvature, with region 132 bending towards compartment 24 and region 133 bending towards compartment 22 in symmetrical fashion. By employing a doubly curved S-shaped intermediate wall, the deformation of the intermediate wall will be advantageously limited when tire 130 is punctured, thereby preventing damage to intermediate wall 138 if it excessively bends.

Figure 1:
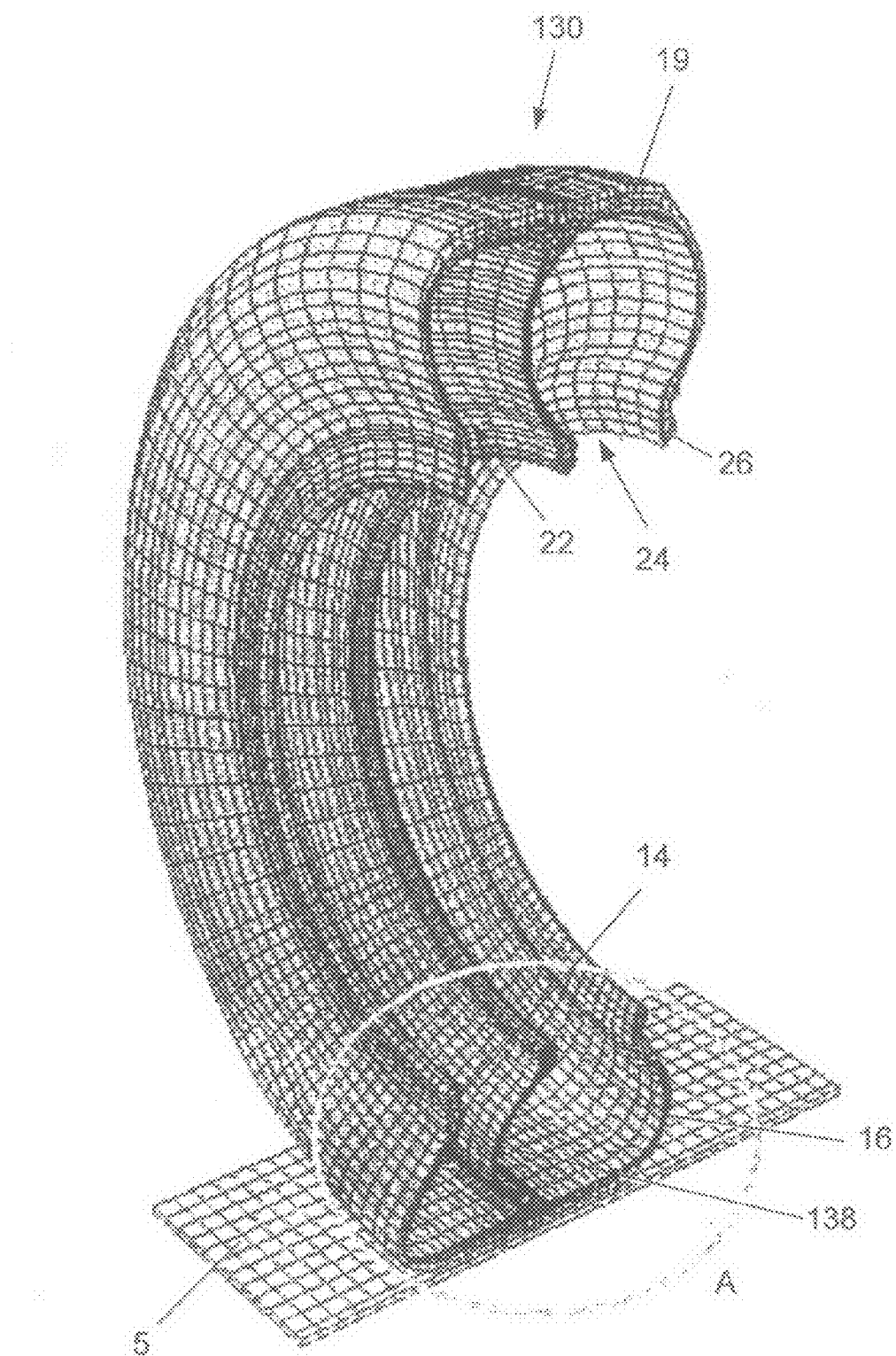
FIG. 1 is a schematic representation in perspective view of a section of a punctured run-flat tire, according to one embodiment of the present invention.
Figure 9:
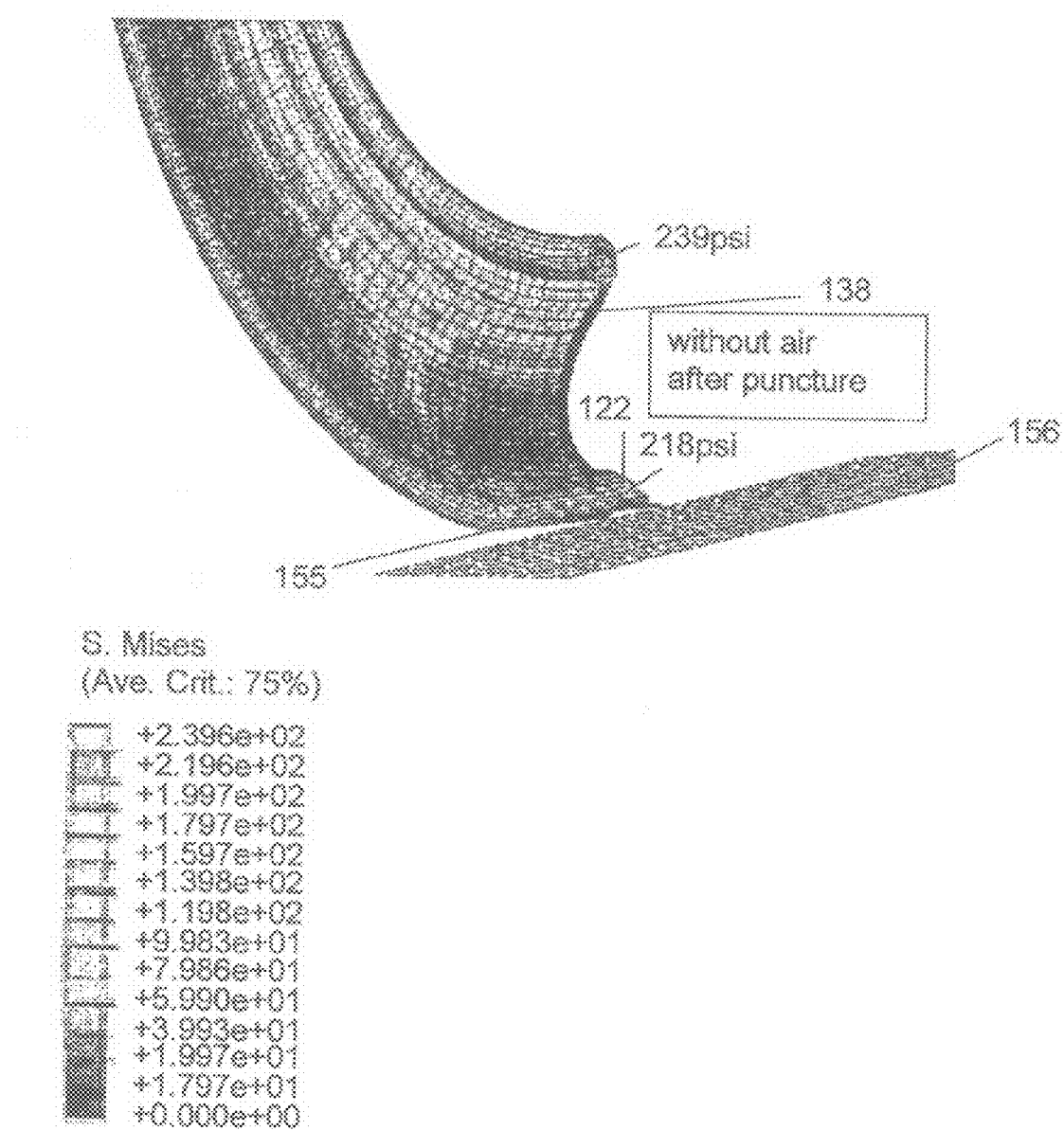
FIG. 9 schematically illustrates the stress concentration distribution along the intermediate wall, when one of the sidewalls is punctured.

FIGS. 1, 2, and 9 illustrate the symmetrical expansion of a tire compartment following an occurrence of a puncture.

FIGS. 1 and 2 illustrate a finite element stress analysis which has been performed with respect to punctured 130 tire under load. FIG. 2 illustrates a magnified view of a portion of tire 10, as represented by Detail A in FIG. 1. Compartment 22 is shown to be more deformed than compartment 24, after sidewall 14 has been punctured. Upon failure of sidewall 14, intermediate wall 138 was forced to carry the load of the vehicle. A stress analysis of the punctured tire under load has been performed, indicating that the stress concentration at region 32 at the connecting point between intermediate wall 138 and base 19 was found to be 218 psi and that the stress concentration at region 33 within the bead wrap of intermediate wall 138 when engaged with the adjacent rim of the wheel was found to be 239 psi, less than the maximum allowable level. It will be appreciated that the stress concentration at regions 32 and 33 of an S-shaped intermediate was found to be equal to a straight intermediate wall, as shown in FIG. 6B. When the tire continued to carry the load after sidewall 14 has been punctured by means of intact compartment 24, the temperature of intermediate wall 138 has been slightly increased after some time.

FIG. 9 schematically illustrates the stress concentration distribution along the intermediate wall, when one of the sidewalls is punctured. The cross-sectional view shows rubber inner liner 122 extending to the right. The stress concentration at the junction between intermediate wall 138 and base 155, which is in contact with the road 156, is also 218 psi. The stress concentration within the bead wrap is also 239 psi. The stress concentration scale is shown on the lower left.

When sidewall 14 is punctured, the pressure of compartment 24 is greater than that of compartment 22. The force derived from the pressure differential between compartments 22 and 24 therefore acts on intermediate wall 138, causing region 132 shown in FIG. 10 to be expanded outwardly towards compartment 22. Due to the load imposed by the weight of the vehicle being supported by tire 130, region 133 shown in FIG. 10 is forced downwards towards road surface 5. The combined effect of the pressure derived force directed towards compartment 22 and the downwardly directed weight derived force changes the configuration of intermediate wall 138 from the S-shape as shown in FIG. 10 to the C-shape as shown in FIG. 2. Since intermediate wall 138 has a C-shape, it is symmetrical with respect to sidewall 16. Compartment 24 is therefore able to assume a symmetrical configuration which promotes a reduced stress concentration.

While some embodiments of the invention have been described by way of illustration, it will be apparent that the invention can be carried into practice with many modifications, variations and adaptations, and with the use of numerous equivalents or alternative solutions, such as a tire having more than two compartments, that are within the scope of persons skilled in the art, without departing from the spirit of the invention or exceeding the scope of the claims.

The invention claimed is:

1. A run-flat tire comprising:
    a. two circumferential sidewalls terminating with a bead wrap at a portion thereof which is proximate to a tire rim;
    b. at least one circumferential intermediate wall interposed between the sidewalls and terminating with a bead wrap at a portion thereof which is proximate to said rim;
    c. a transverse base extending from one sidewall to the other, thereby defining a compartment between a sidewall and an adjacent intermediate wall or between two adjacent intermediate walls;
    d. a carcass comprising a portion which is embedded within each sidewall, each intermediate wall and base, a carcass portion within an intermediate wall being connected to a carcass portion within said base by a T-shaped connection; and
    e. shock absorber means provided in the vicinity of said T-shaped connection, said shock absorber means comprising a sponge, wherein each of said compartments is adapted to assume an expanded symmetrical configuration when an adjacent sidewall or intermediate wall is punctured.

2. The run-flat tire according to claim 1, wherein a single continuous inner liner is applied to the inner face of the sidewalls and to the two inner faces of each of the intermediate walls, the shock absorber means being provided between each inner liner portion in the vicinity of the T-shaped connection and a corresponding carcass portion of the T-shaped connection such that body plies and optionally an additional ply in contact with said inner liner portion are interposed between said inner liner portion and said shock absorber means.

3. The run-flat tire according to claim 2, wherein the shock absorber means comprises two sponges.

4. The run-flat tire according to claim 2, wherein the shock absorber means is in contact with the corresponding carcass portion.

5. The run-flat tire according to claim 2, wherein at least one body ply is interposed between the shock absorber means and the corresponding carcass portion.

6. The run-flat tire according to claim 2, further comprising a padding element affixed to the bead wrap of each intermediate wall.

7. The run-flat tire according to claim 1, wherein the carcass portions are single-ply.

8. The run-flat tire according to claim 1, wherein the carcass portions are two separated plies.

9. The run-flat tire according to claim 8, wherein a carcass portion within a sidewall bifurcates at an intermediate point thereof.

10. The run-flat tire according to claim 9, wherein a cross member connects the end of the two plies of the carcass portion within a sidewall which is proximate to the tire rim.

11. The run-flat tire according to claim 8, wherein a carcass portion within an intermediate wall bifurcates within the bead wrap thereof.

12. The run-flat tire according to claim 11, wherein a plurality of cross members connect the two plies of the carcass portion within the bead wrap of the intermediate portion.

13. The run-flat tire according to claim 8, wherein two carcass portions extend substantially throughout each of the base, sidewalls and intermediate wall, the carcass portions within the intermediate wall being connected with an upper carcass portion within the base, and each carcass portion within the base being combined with a corresponding carcass portion within each of the sidewalls.

14. The run-flat tire according to claim 1, wherein an unloaded intermediate wall is configured with a doubly curved structure.

15. The run-flat tire according to claim 14, wherein an unloaded intermediate wall has two symmetrical convex regions, each of said convex regions protruding into a different compartment adjacent to said intermediate wall.

16. The run-flat tire according to claim 14, wherein a cross member connects the end of the two plies of the carcass portion within a sidewall which is proximate to the tire rim.

17. A run-flat tire comprising:
   a. two circumferential sidewalls terminating with a bead wrap at the inner portion thereof;
   b. at least one circumferential intermediate wall interposed between the sidewalls and terminating with a bead wrap at the inner portion thereof;
   c. a transverse base extending from one sidewall to the other, thereby defining a compartment between a sidewall and an adjacent intermediate wall or between two adjacent intermediate walls;
   d. a carcass comprising a portion which is embedded within each sidewall, each intermediate wall and base; and
   e. shock absorber means provided in the vicinity of a junction connecting each of said intermediate walls to said base,
   wherein the shock absorber means is a ball joint, said ball joint being received in a socket which is connected to the carcass portion within an intermediate wall and the carcass portion within said base,
   wherein each of said compartments is adapted to assume an expanded symmetrical configuration when an adjacent sidewall or intermediate wall is punctured.

* * * * *